United States Patent [19]

Dupuis et al.

[11] Patent Number: 5,277,147

[45] Date of Patent: Jan. 11, 1994

[54] BIRD FEED HOLDER

[76] Inventors: James L. Dupuis; Kris R. Dupuis, both of 733 Kris La., Mosinee, Wis. 54455

[21] Appl. No.: 919,549

[22] Filed: Jul. 22, 1992

[51] Int. Cl.⁵ .............................................. A01K 39/01
[52] U.S. Cl. .................................... 119/18; 119/52.2
[58] Field of Search .................. 119/18, 52.2; 30/124, 14, 128

[56] References Cited

U.S. PATENT DOCUMENTS

| | | | |
|---|---|---|---|
| 2,309,830 | 2/1943 | Dearle | 119/18 |
| 2,773,473 | 12/1956 | Martin | 119/18 |
| 3,314,397 | 4/1967 | Jacobsen | 119/18 |
| 4,184,450 | 1/1980 | Atchley et al. | 119/18 |
| 4,437,432 | 3/1984 | Immeyer et al. | 119/18 |
| 4,669,421 | 6/1987 | Flintjer | 119/18 |
| 4,974,546 | 12/1990 | Burgett | 119/18 |

FOREIGN PATENT DOCUMENTS 770313 9/1934 France ............................... 119/18

*Primary Examiner*—John G. Weiss
*Attorney, Agent, or Firm*—Michael, Best & Friedrich

[57] ABSTRACT

A bird feed holder for a bird cage, the holder comprising a plate, a clip for supporting the plate within the cage, a mechanism for securing a bird treat to the plate, and a shield on the plate for preventing waste separated from the treat from leaving the cage.

18 Claims, 1 Drawing Sheet

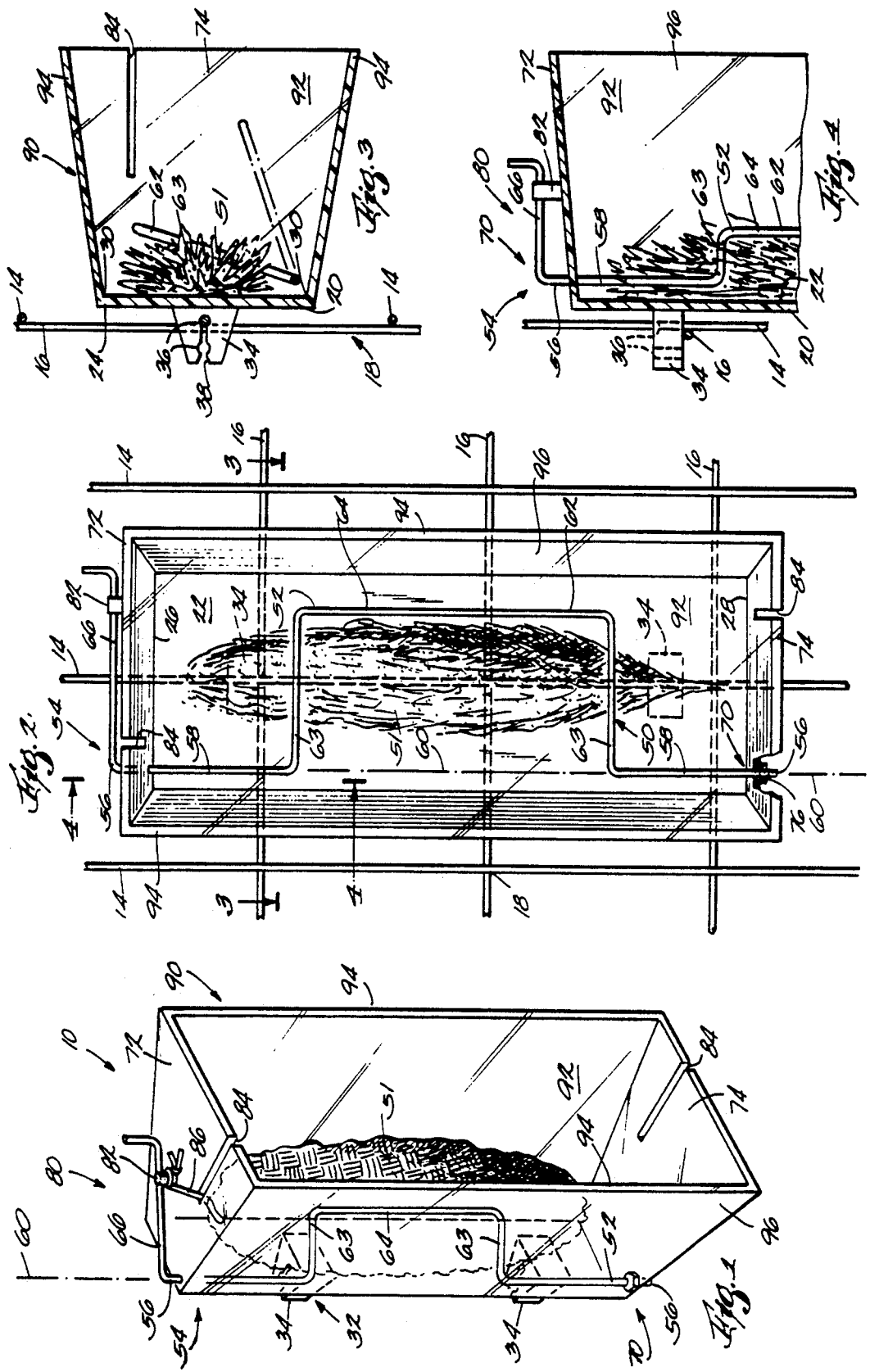

BIRD FEED HOLDER

BACKGROUND OF THE INVENTION

1. Technical Field

The invention relates to bird feed holders, and particularly to bird feed holders for use in a bird cage.

2. Related Prior Art

As a popular feed for birds, millet comes in a variety of forms. While commonly sold loose as seed, millet is also sold as a bird feed in various molded shapes such as bells, pine cones and elongated "honey sticks". Loose millet can be molded into such solid forms by mixing the millet with an edible adhesive, such as dextrose syrup. Sprays of millet, i.e. bunches of seed still attached to its stem, are also used as a feed for birds. Molded millet and sprays of millet are especially popular as a feed for caged birds and are commonly known as "bird treats."

Bird treats are typically supported within a bird cage adjacent a perch at a relatively high position. One way bird treats are suspended within the bird cage is by a string that extends from the bird treat and that is tied to the cage. A bird treat suspended within the cage by a string swings as a bird pecks seed from the bird treat. It is also known to use a clip that engages a portion of a bird treat to support the bird treat on a wire wall of the cage so that a bird in the cage can eat seed from the bird treat.

One of the problems resulting from these methods for supporting a bird treat within the cage is that a bulk of the waste, such as husks, seeds and pieces of stem, falling away from the bird treat is thrown outside of the cage, which can create a substantial mess.

It is known to provide a mat or drop cloth spread underneath the cage to catch such waste thrown outside the cage. It is also known to provide the cage with solid walls extending from the bottom of the cage partially up the sides of the cage to contain falling waste within the cage.

SUMMARY OF THE INVENTION

The use of spreads surrounding the cage to catch waste falling outside the cage are often inadequate to catch all the waste and are often difficult to clean.

Also, such known methods of containing the bird treat waste within the cage are generally ineffective because the bird treats are typically supported relatively high in the bird cage yet the devices for containing the waste are located near the bottom of the cage remotely from the source of the waste. As a result, a considerable portion of the waste falling from the upper reaches of the cage still falls out of the cage before reaching the cage's bottom. Such is particularly the case if the bird treat is suspended by a string and allowed to swing.

The invention provides a bird feed holder for a bird cage, the holder comprising a plate fixed to the cage, means for supporting a bird treat on the plate, and means on the plate for preventing waste from the bird treat from leaving the cage.

One embodiment of the invention provides a bird feed holder for a bird cage, the holder comprising a plate, means for supporting the plate interiorly of the cage, and means for securing a bird treat to the plate.

One embodiment of the invention provides a bird feed holder for a bird cage, the holder comprising a plate, mounting means for removably supporting the plate on the cage, means for securing a bird treat to the plate, and means on the plate for preventing waste from the bird treat from leaving the cage.

A feature of the invention is the provision of a bird feed holder that supports a bird treat securely and stationary relative to the bird cage. When the bird treat is so secured, waste from the treat is less likely to be thrown outside the cage.

Another feature of the invention is the provision of a deflecting shield located adjacent the bird treat to prevent waste from the bird treat from being thrown outside the cage.

Various other features and advantages of the invention will become apparent to those skilled in the art upon review of the following detailed description, claims and drawings.

BRIEF DESCRIPTION OF THE DRAWINGS

FIG. 1 is a perspective view of a bird feed holder embodying the invention.

FIG. 2 is a front elevation view of the bird feed holder illustrated in FIG. 1.

FIG. 3 is a cross-sectional view taken along line 3—3 in FIG. 2.

FIG. 4 is a cross-sectional view taken along line 4—4 in FIG. 2.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

The drawings illustrate a bird feed holder 10 for use within a bird cage (not shown) having a plurality of spaced-apart vertically extending wires 14 and a plurality of spaced-apart horizontally extending wires 16 that are joined to form a grid-like wall 18. The holder 10 includes a generally rectangular plate 20 having (FIGS. 3 and 4) opposite generally flat surfaces 22, 24 respectively facing inwardly and outwardly of the cage. The plate 20 also includes (FIG. 2) upper and lower edges 26, 28 and (FIG. 3) a pair of lateral edges 30 extending between the upper and lower edges 26, 28.

The holder 10 also includes mounting means 32 for removeably supporting the plate 20 on the wall 18 interiorly of the cage. While various suitable mounting means 32 can be used successfully, in the illustrated embodiment of the holder 10, the mounting means 32 includes a pair of clips 34 that are integrally formed with, and extend from, the outwardly facing surface 24 of the plate 20. As best shown in FIG. 3, each clip 34 has extending therethrough a pair of wire holes 36 which are sized to surround one of the wires 14, 16 of the wall 18. Each clip 34 also has a slit 38 that extends from the outer end of each clip 34 toward the plate 20 and that connects the pair of wire holes 36.

The clips 34 are preferably made of a resiliently deflectable plastic so that each clip 34 can be moved into and out of engagement with one of the wires 14, 16 by sliding each clip 34 into or out of surrounding relation with the wire. When one of the wire holes 36 surround the wire, the slit returns to its undeflected position. The clips 34 thus releasably secure the plate 20 to the cage. Preferably, as best shown in FIG. 3., each hole of the pair of wire holes 36 has a different diameter so that each clip 34 can releasably engage two gauges of wire. In other words, the clips 34 provide means for supporting the plate 20 on a cage having a first gauge of wire and for supporting the plate 20 on another cage having a second gauge of wire.

As shown in FIG. 2, the pair of clips 34 are vertically aligned to support the inwardly and outwardly facing surfaces of the plate 20 in a generally vertical planes, i.e., parallel to the wall 18. As shown in FIG. 2, while the clips 34 are spaced apart, the clips 34 need not be spaced apart a distance identical to the spacing between the horizontal wires 16. Rather, the plate 20 can be supported on the wall 18 by a single clip 34 releaseably engaged with a vertical wire 14 and resting on a horizontal wire 16. Though not illustrated, it should be readily understood that the clips 34 can also be releasably engaged with one of the horizontal wires 16 to secure the plate 20 to the wall 18.

The holder 10 also includes means 50 for securing a bird treat 51 to the plate 20. While various suitable means 50 for securing a bird treat 51 to the plate 20 can be used successfully, in the illustrated embodiment of the bird feed holder 10, the bird treat securing means 50 includes a fastener member 52 adapted to engage the bird treat 51 and means 54 for supporting the fastener member 52 for movement relative to the plate 20.

As best shown in FIG. 2, the fastener member 52 has opposite ends 56 and includes a pair of relatively straight, aligned end portions 58 that define a pivot axis 60. The fastener member 52 also includes a crank portion 62 that extends between the end portions 58 and that extends away from the pivot axis 60. In particular, the crank portion 62 includes a pair of parallel radial legs 63 respectively extending from the end portions 58 in a radial direction relative to the pivot axis 60 and an intermediate leg 64 extending generally parallel to the pivot axis 60 and connecting the radial legs 63.

For reasons discussed below, one of the opposite ends 56 of the fastener member 52 (the upper end in the drawings) supports a handle 66 that is fixed to one of the end portions 58 and that extends away from the pivot axis 60. Preferably, the fastener member 52 is made of wire and is resiliently deflectable so that, for reasons explained below, the handle 66 can be moved slightly away from its undeflected position and will return resiliently to its undeflected position. Also, the fastener member 52 has a length sufficient to extend substantially the entire length of the plate 20 in order to secure a bird treat 51 to the plate 20 in a manner discussed below.

While various suitable constructions could be used successfully for the means 54 for supporting the fastener member 52 for movement relative to the plate 20, in the illustrated embodiment of the bird feed holder 10, such means 54 for supporting the fastener member 52 includes means 70 on the plate 20 for pivotally supporting the fastener member 52 for pivotable movement relative to the plate 20 about the pivot axis 60. In particular, the means 70 includes a pair of upper and lower end walls 72, 74 respectively extending from the upper and lower edges 26, 28 of the plate 20 at an oblique angle relative to the inwardly facing surface 22 of the plate 20. As best shown in FIGS. 2 and 4, the upper end wall 72 extends upwardly away from the upper edge of the plate 20 and the lower end wall 74 extends downwardly away from the lower edge of the plate 20.

The opposite ends 56 of the fastener member 52 respectively extend through the upper and lower end walls 72, 74 and are pivotally supported thereby to afford rotation of the fastener member 52 about the pivot axis 60. The fastener member 52 is fixed longitudinally of the pivot axis 60 to the plate 20 by the engagement of the handle 66 ad the upper end wall 72 and by the engagement of the lower end wall 74 with (FIG. 2) a self-locking nut 76 that is fixed to the end of the fastener member 52 opposite the handle 66 (the lower opposite end 56 of the fastener member 52 in the drawings).

As shown in FIG. 3, the fastener member 52 is pivotable about the pivot axis 60 between an open position (shown in phantom in FIG. 3) wherein the crank portion 62 is rotated away from the inwardly facing surface 22 of the plate 20 and closed position (shown in FIGS. 2.4) wherein the crank portion 62 is adjacent the inwardly facing surface 22. In the closed position, the crank portion 62 is engageable with a bird treat 51 and secures the bird treat 51 against the inwardly facing surface 22 of the plate 20. In FIG. 1, the fastener member 52 is engaged with a bird treat 51 in the form of an elongated "honey stick." In FIGS. 2-4, the bird treat 51 is a spray of millet.

When the fastener member 52 is moved into the closed position and engages a bird treat 51, the radial legs 63 of crank portion 62 engage the bird treat 51 along the length of the bird treat 51. Such an arrangement secures substantially the entire length of the bird treat 51, which helps prevent waste from being thrown from the bird treat 51. Also, when so secured, the bird treat 51 is prevented from swinging or sliding relative to the plate 20 and, therefore, relative to the cage which also helps prevent waste from being thrown from the bird treat 51.

The means 50 for securing a bird treat 51 to the plate 20 also includes locking means 80 for securing the fastener member 52 in its closed position. While various suitable constructions for the locking means 80 could be used, in the illustrated embodiment, the locking means 80 includes (FIG. 2) a peg 82 extending from the upper end wall 72 in such a position so as to be engagable by the handle 66. Because the fastener member 52 is preferably made of wire that can be resiliently deflected, when the crank portion 62 engages a bird treat 51 to hold the bird treat 51 against the plate 20, the handle 66 can be biased against the crank portion 62 and into engagement with the peg 82 to hold the fastener member 52 in its closed position.

The means 50 for securing a bird treat 51 to the plate 20 also includes (FIG. 1) a pair of slots 84 that extend respectively into the upper and lower end walls 72, 74 and that are adapted to receive a supporting string 86 attached to a bird treat 51. As shown in FIG. 1, such a bird treat 51 can be held securely against the plate 20 without the string 86 dangling from the bird treat 51 by moving the string 86 into one of the slots 84 and winding the string 86 about either the peg 82 (as shown in FIG. 1) or, while not shown, the nut 76 on the end of the fastener member 52. The fastener member 52 can then be moved into the closed position to engage the bird treat 51.

The holder 10 also includes means 90 on the plate 20 for preventing waste from the bird treat 51 from leaving the cage. While various suitable means 90 on the plate 20 for preventing bird treat waste from leaving the cage can be successfully used, in the preferred embodiment, such means 90 includes means 92 for deflecting waste into the cage. In the illustrated embodiment of the holder 10 the deflecting means 92 includes the upper and lower end walls 72, 74 and also includes a pair of side walls 94 respectively extending laterally from the lateral edges of the plate 20 and connected to the upper and lower end walls 72, 74. Together, the side walls 94 and upper and lower end walls 72, 74 define a shield 96 that surrounds the plate 20.

The side walls 94 and the upper and lower end walls 72, 74 extend from the plate 20 at an angle sufficient to deflect waste from the bird treat 51 into the cage but are not so close to being perpendicular to the inwardly facing surface 22 of the plate 20 so as to trap or hold waste from the bird treat 51. If the shield 96, and particularly the lower end wall 74, is so arranged the shield 96 may also catch and hold excrement from the bird which can lead to unsanitary conditions for the bird.

As shown in FIGS. 3 and 4, the shield 96 surrounds the plate 20 and extends from the plate 20 past the bird treat 51 and the fastener member 52. Because the shield 96 is located adjacent the securely supported bird treat 51, the bulk of the waste from the bird treat 51 either falls onto the lower end wall 74 and is deflected inwardly of the cage or is deflected by the other portions of the shield 96 into the cage. By preventing the waste from leaving the cage, the bird feed holder 10 facilitates waste clean-up and obviates the need for mats or other spreads surrounding the cage to catch the waste.

Various other features of the invention are set forth in the following claims.

We claim:

1. A bird feed holder for a bird cage, said holder comprising a plate adapted to be fixed interiorly of the cage, fastener means for releasably securing a bird treat on said plate, said fastener means including a fastener member including opposite ends and a crank portion located intermediate said opposite ends, and means for supporting said fastener member and for affording movement of said fastener member relative to said plate between an open position wherein said crank portion of said fastener member is moved away from said plate and a closed position wherein said crank portion of said fastener member is located between said open position and said plate and is engaged with the bird treat, and means on the plate for preventing waste from the bird treat from leaving the cage.

2. A bird feed holder as set forth in claim 1 wherein said plate has a planar surface, and wherein said means for securing a bird treat on said plate secures the bird treat against said planar surface.

3. A bird feed holder as set forth in claim 2 wherein said fastener member is pivotable about a pivot axis relative to said plate.

4. A bird feed holder as set forth in claim 1 wherein the bird treat is elongated, and wherein said fastener member is engageable with substantially the entire length of the bird treat.

5. A bird feed holder as set forth in claim 1 wherein said fastener means includes means for securing said fastener member in said closed position.

6. A bird feed holder as set forth in claim 1 wherein said means for supporting said fastener member includes a pair of walls respectively engaged with said opposite ends and affording movement of said fastener member relative to said walls.

7. A bird feed holder as set forth in claim 6 wherein said opposite ends of said fastener member define a pivot axis, wherein said crank portion is spaced form said pivot axis and wherein said walls afford pivotal movement of said crank portion about said pivot axis between said open and closed positions.

8. A bird feed holder as set forth in claim 7 and further including locking means for securing said fastener member in said closed position.

9. A bird feeder as set forth in claim 7 wherein said means for preventing waste form leaving the cage includes said pair of walls.

10. A bird feeder as set forth in claim 7 wherein said fastener member is fixed longitudinally of said pivot axis.

11. A bird feed holder for a bird cage, said holder comprising a generally planar plate, mounting means for removably supporting said plate interiorly of the cage, means for releasably securing a bird treat to said plate, and deflector means on the plate for preventing waste from the bird treat from leaving the cage, said deflector means including a shield having a first pair of opposed surfaces facing said bird treat and extending at an obtuse angle from said planar surface.

12. A bird feed holder as set forth in claim 11 wherein said means for securing a bird treat to said plate includes a fastener member, and means for supporting said fastener member for movement relative to said plate.

13. A bird feed holder as set forth in claim 11 wherein said shield has a second pair of opposed surfaces facing said bird treat and extending at an obtuse angle from said planar surface.

14. A bird feed holder as set forth in claim 13 wherein said means for securing a bird treat includes a fastener member extending between one of said pairs of said opposed surfaces.

15. A bird feed holder as set forth in claim 14 wherein said fastener member is movable relative to said planar surface between an open position wherein a portion of said fastener member is spaced from said planar surface and a closed position wherein said portion is between said open position and said planar surface.

16. A bird feed holder as set forth in claim 15 wherein said each surface of said first and second pairs of opposed surfaces extends away from said planar plate beyond said portion of said fastener member when said fastener member is in said closed position.

17. A bird feed holder for a bird cage, said holder comprising a plate having a generally planar surface, mounting means for removably supporting said plate interiorly of the cage with said planar surface facing inwardly of the cage, fastening means for securing a bird treat against said planar surface including a fastener member having opposite ends defining a pivot axis and a crank portion extending intermediate said opposite ends and spaced from said axis, said fastening means including means on said plate for supporting said fastener member and for affording pivotable movement of said crank portion about said pivot axis, relative to said planar surface and into engagement with the bird treat, said means for supporting said fastener member including a pair of amounts engaged with respective opposite ends of said fastener member, and deflector means on the plate for preventing waste from the bird treat from leaving the cage, said deflector means including a shield surrounding said intermediate portion of said fastener member and said shield including at least one pair of side walls located respectively on opposite sides of the bird treat and extending at an obtuse angle from said planar surface away from the bird treat.

18. A bird feed holder as set forth in claim 17 wherein said deflector means extends away from said planar surface past said crank portion when said crank portion is engaged with the bird treat.

* * * * *

UNITED STATES PATENT AND TRADEMARK OFFICE
CERTIFICATE OF CORRECTION

PATENT NO. : 5,277,147
DATED : January 11, 1994
INVENTOR(S) : James L. Dupuis and Kris R. Dupuis It is certified that error appears in the above-identified patent and that said Letters Patent is hereby corrected as shown below:

IN THE CLAIMS

In Claim 7, line 67, column 5, "form" should be --from--.

In Claim 17, line 56, column 6, "amounts" should be --mounts--.

Signed and Sealed this

Twenty-fourth Day of May, 1994

Attest:

BRUCE LEHMAN

Attesting Officer

Commissioner of Patents and Trademarks